(12) United States Patent
Wakinaka

(10) Patent No.: US 11,646,440 B2
(45) Date of Patent: May 9, 2023

(54) ELECTRICITY STORAGE MODULE

(71) Applicant: Panasonic Intellectual Property Management Co., Ltd., Osaka (JP)

(72) Inventor: Kiyoshi Wakinaka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 406 days.

(21) Appl. No.: 17/011,055

(22) Filed: Sep. 3, 2020

(65) Prior Publication Data
US 2020/0402730 A1 Dec. 24, 2020

Related U.S. Application Data

(63) Continuation of application No. PCT/JP2019/012824, filed on Mar. 26, 2019.

(30) Foreign Application Priority Data

Mar. 30, 2018 (JP) .............................. JP2018-069687

(51) Int. Cl.
*H01M 10/052* (2010.01)
*H01G 2/10* (2006.01)
(Continued)

(52) U.S. Cl.
CPC .......... *H01M 10/052* (2013.01); *H01G 2/103* (2013.01); *H01G 4/38* (2013.01);
(Continued)

(58) Field of Classification Search
None
See application file for complete search history.

(56) References Cited

U.S. PATENT DOCUMENTS 3,791,875 A * 2/1974 Koehler .................. B63C 11/52
206/811
5,004,129 A * 4/1991 Loch .................... H01M 50/204
206/703

(Continued)

FOREIGN PATENT DOCUMENTS

JP 2003-142049 A 5/2003
JP 2004-031104 1/2004
(Continued)

OTHER PUBLICATIONS

Abstract KR20160116566A. (Year: 2016).*

(Continued)

*Primary Examiner* — Gregg Cantelmo
(74) *Attorney, Agent, or Firm* — McDermott Will & Emery LLP

(57) ABSTRACT

An electricity storage module includes: an electricity storage device; a case that houses the electricity storage device and includes a bottom surface part and the opening part located at a side opposite to the bottom surface part; a lid that covers an opening part; and a sealing member that seals between the case and the lid. The case has a first case surface that surrounds the opening part along an outer periphery of the opening part. The lid has a first lid surface facing the first case surface. The sealing member is disposed between the first case surface and the first lid surface.

20 Claims, 11 Drawing Sheets

(51) Int. Cl.
*H01G 4/38* (2006.01)
*H01G 11/74* (2013.01)
*H01G 11/78* (2013.01)
*H01M 50/213* (2021.01)
*H01M 50/24* (2021.01)
*H01M 50/271* (2021.01)

(52) U.S. Cl.
CPC ............ *H01G 11/74* (2013.01); *H01G 11/78* (2013.01); *H01M 50/213* (2021.01); *H01M 50/24* (2021.01); *H01M 50/271* (2021.01)

(56) References Cited

U.S. PATENT DOCUMENTS

| | | | | |
|---|---|---|---|---|
| 2004/0121226 A1* | 6/2004 | Kaelin | ................ | H01M 50/216 429/96 |
| 2011/0052965 A1 | 3/2011 | Kim et al. | | |
| 2017/0278645 A1 | 9/2017 | Wakinaka et al. | | |
| 2018/0361874 A1* | 12/2018 | Kobayashi | .......... | H01M 50/271 |
| 2018/0375068 A1* | 12/2018 | Makabe | .............. | H01M 50/209 |

FOREIGN PATENT DOCUMENTS

| | | | |
|---|---|---|---|
| JP | 2012-124131 | | 6/2012 |
| KR | 20160116566 A | * | 10/2016 |
| WO | 2016/110886 | | 7/2016 |

OTHER PUBLICATIONS www.espacenet.com machine translation of KR20160116566A. (Year: 2016).*
www.espacenet.com machine translation of JP2004031104A. (Year: 2004).*
International Search Report of PCT application No. PCT/JP2019/012824 dated Jun. 25, 2019.
English Translation of Chinese Office Action dated Oct. 20, 2021 for the related Chinese Patent Application No. 201980022742.5.

* cited by examiner

ELECTRICITY STORAGE MODULE

RELATED APPLICATIONS

This application is a continuation of the PCT International Application No. PCT/JP2019/012824 filed on Mar. 26, 2019, which claims the benefit of foreign priority of Japanese patent application No. 2018-069687 filed on Mar. 30, 2018, the contents all of which are incorporated herein by reference.

BACKGROUND

1. Technical Field

The present disclosure relates to an electricity storage module.

2. Description of the Related Art

International Patent Publication No. WO 2016/110886, for example, describes an electricity storage unit configured with: a plurality of electricity storage devices; a holder holding the electricity storage devices; a control board that is supported by the holder and is electrically connected to the electricity storage devices; a connector electrically connected to the electricity storage devices; a case that has a bottomed cylinder shape; and a lid sealing the case. The case houses the plurality of electricity storage devices, the holder, the control board, and the connector.

In the electricity storage unit of International Patent Publication No. WO 2016/110886, the lid is put in a case housing part that is disposed at an opening part side of the case, and is fixed to the case with screws. The connector is exposed to outside of the case through a through-hole provided in the lid.

SUMMARY

An electricity storage module according to the present disclosure includes: an electricity storage device; a case that houses the electricity storage device and includes a bottom surface part and the opening part located at a side opposite to the bottom surface part; a lid that covers an opening part; and a sealing member that seals between the case and the lid. The case has a first case surface that surrounds the opening part along an outer periphery of the opening part. The lid has a first lid surface that faces the first case surface. The sealing member is disposed between the first case surface and the first lid surface.

Note that the term "face" does not necessarily means that members facing each other are not parallel to each other.

The present disclosure can improve water-tightness between the case that houses the electricity storage device and the lid that covers the opening part of the case.

An effect and significance of the present disclosure will be apparent through the description of the exemplary embodiment shown below. However, the exemplary embodiment shown below is merely one example of implementation of the present disclosure, and the present disclosure is not at all limited to the example described in the following exemplary embodiment.

DETAILED DESCRIPTION OF EMBODIMENT

Figure 1:
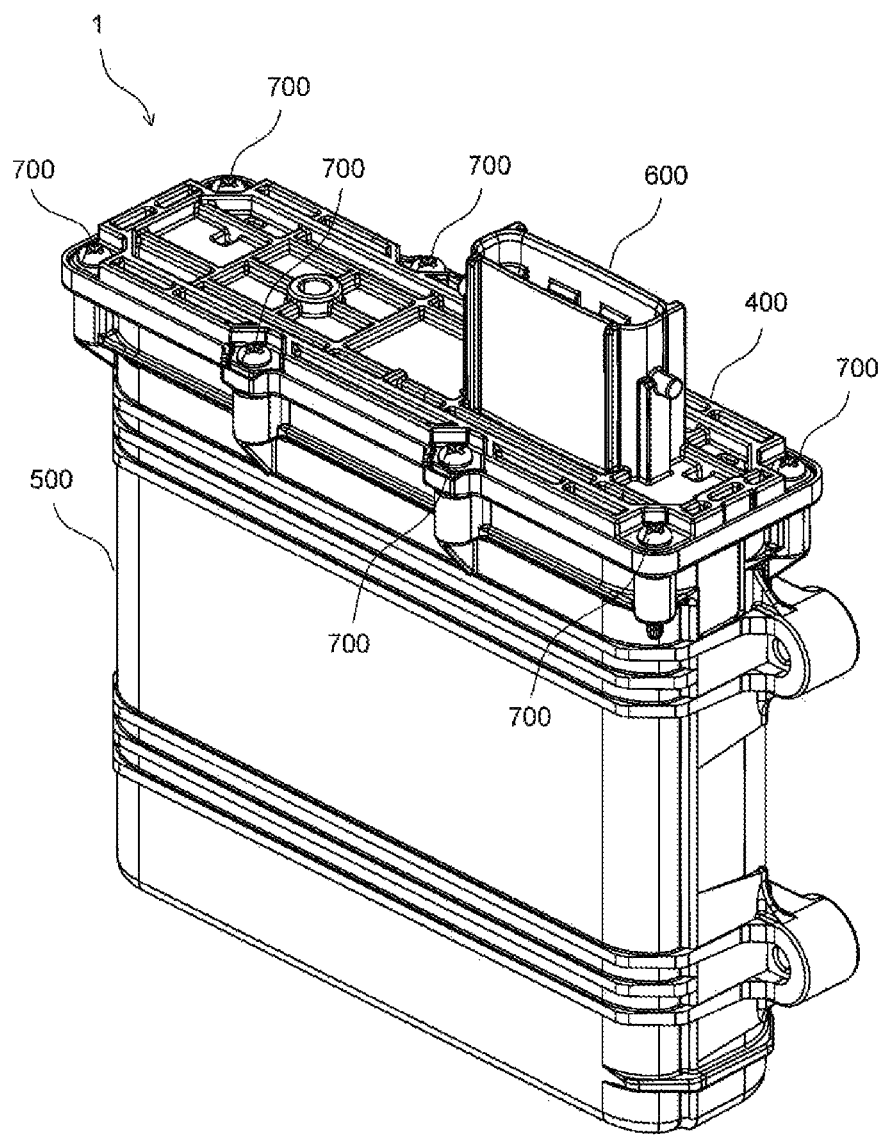
FIG. 1 is a perspective view illustrating an electricity storage module according to an exemplary embodiment.
Figure 1:
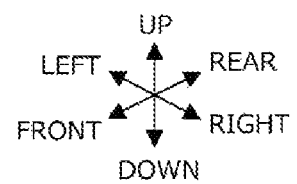

In the electricity storage unit of International Patent Publication No. WO 2016/110886, a boundary (seam) between the lid and the case is not exposed on a side wall part but is exposed only on the opening part. This configuration prevents water drops from entering inside the case through the boundary from any direction other than the direction in which the lid and the bottom surface part of the case face each other, and can therefore reduce a possibility of water drops entering inside the case.

However, in a case where the electricity storage unit is used in such an environment that the electricity storage unit is more likely to be exposed to water, higher water-tightness is required to prevent water from entering inside the case when water enters through the boundary between the lid and the case.

In view of such an issue, the present disclosure provides an electricity storage module whose water-tightness is improved between the case that houses an electricity storage device and the lid that covers the opening part of the case.

In the following, electricity storage module 1 according to the present exemplary embodiment will be described with reference to the drawings. For the sake of convenience, directions including front and rear, left and right, and up and down are added to the drawings as appropriate. However, the directions in the drawings represent relative directions of electricity storage module 1, but do not represent absolute directions.

In the present exemplary embodiment, top surface 410a corresponds to "fourth lid surface" described in the claims Bottom surface 410b corresponds to "first lid surface" described in the claims. Peripheral surface 410c corresponds to "third lid surface" described in the claims Outer peripheral surface 451a corresponds to "second lid surface" described in the claims. Inner peripheral wall surface 507 corresponds to "fifth case surface" described in the claims. Inner edge surface 551 corresponds to "first case surface" described in the claims. Outer edge surface 552 corresponds to "second case surface" described in the claims. Inner peripheral surface 553 corresponds to "third case surface" described in the claims Outer peripheral surface 554 corresponds to "fourth case surface" described in the claims. Corner screw hole 555 corresponds to "first fixing part" described in the claims. Intermediate screw hole 556 corresponds to "second fixing part" described in the claims. Gasket 800 corresponds to "sealing member" described in the claims. Space S1 corresponds to "first space" described in the claims, and space S2 corresponds to "second space" described in the claims.

However, the above description is only intended to define correspondences between components in the claims and components in the exemplary embodiment. The correspondences described above do not limit the scope of the disclosure described in the claims to the configuration described in the exemplary embodiment.

Figure 2:
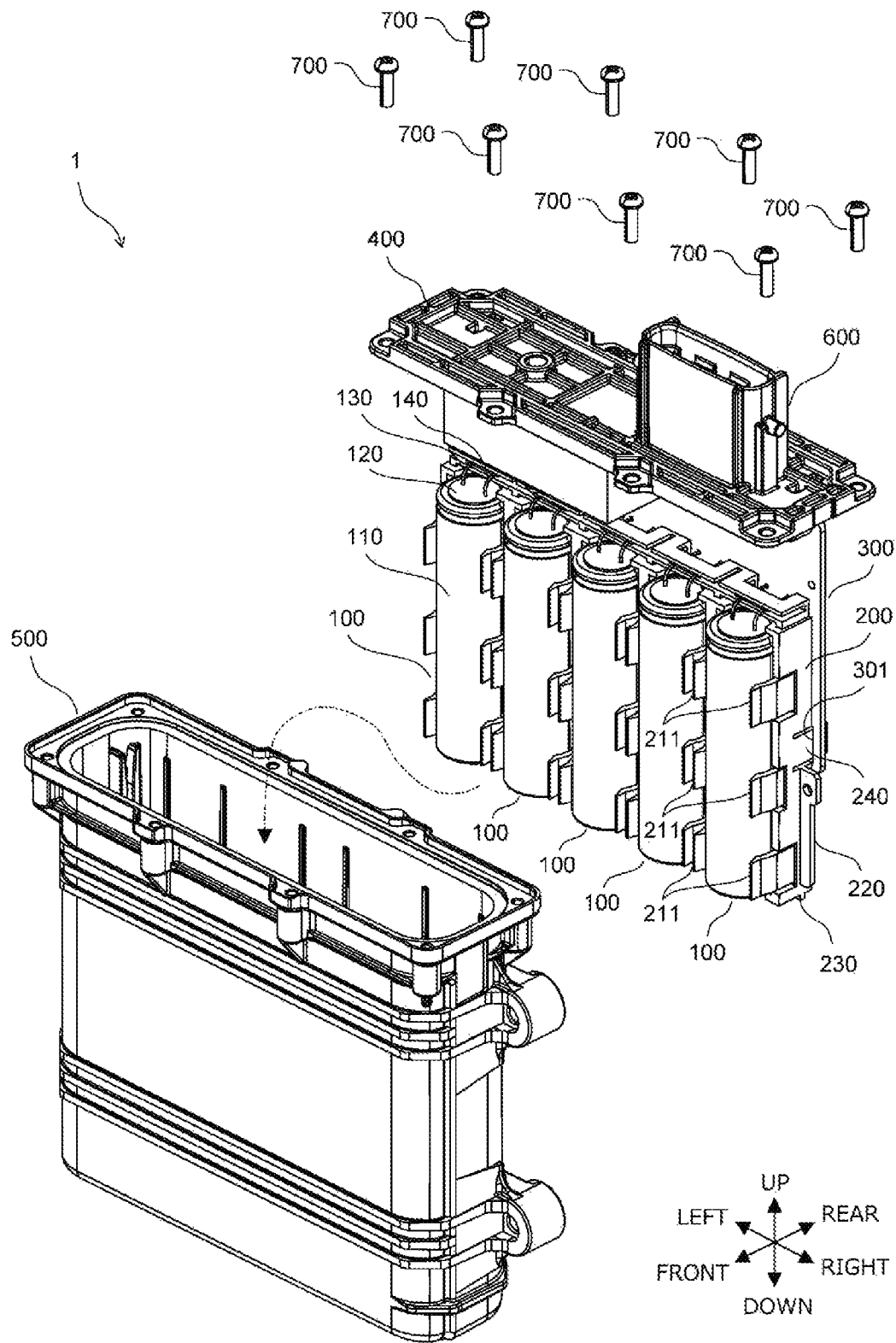
FIG. 2 is an exploded perspective view illustrating the electricity storage module according to the exemplary embodiment.

FIG. 1 is a perspective view illustrating electricity storage module 1 according to the present exemplary embodiment. FIG. 2 is an exploded perspective view illustrating electricity storage module 1 according to the present exemplary embodiment. Note that FIG. 2 does not illustrate gasket 800.

Electricity storage module 1 includes five electricity storage devices 100, device holder 200, circuit board 300, lid 400, and case 500. Connector 600 is integrally formed on lid 400. After assembling to integrate device holder 200 holding five electricity storage devices 100, circuit board 300, and lid 400, device holder 200 holding electricity storage devices 100 and circuit board 300 are stored in case 500, so that opening part 506 of case 500 is covered with lid 400. Lid 400 is fixed to case 500 with eight screws 700.

Electricity storage module 1 is used for various types of electronic equipment, electric equipment, industrial equipment, and vehicles to assist or back up electric power. When electricity storage module 1 is mounted, for example, on a vehicle, electricity storage devices 100 can be charged with electric power supplied from a battery of the vehicle.

Figure 3:
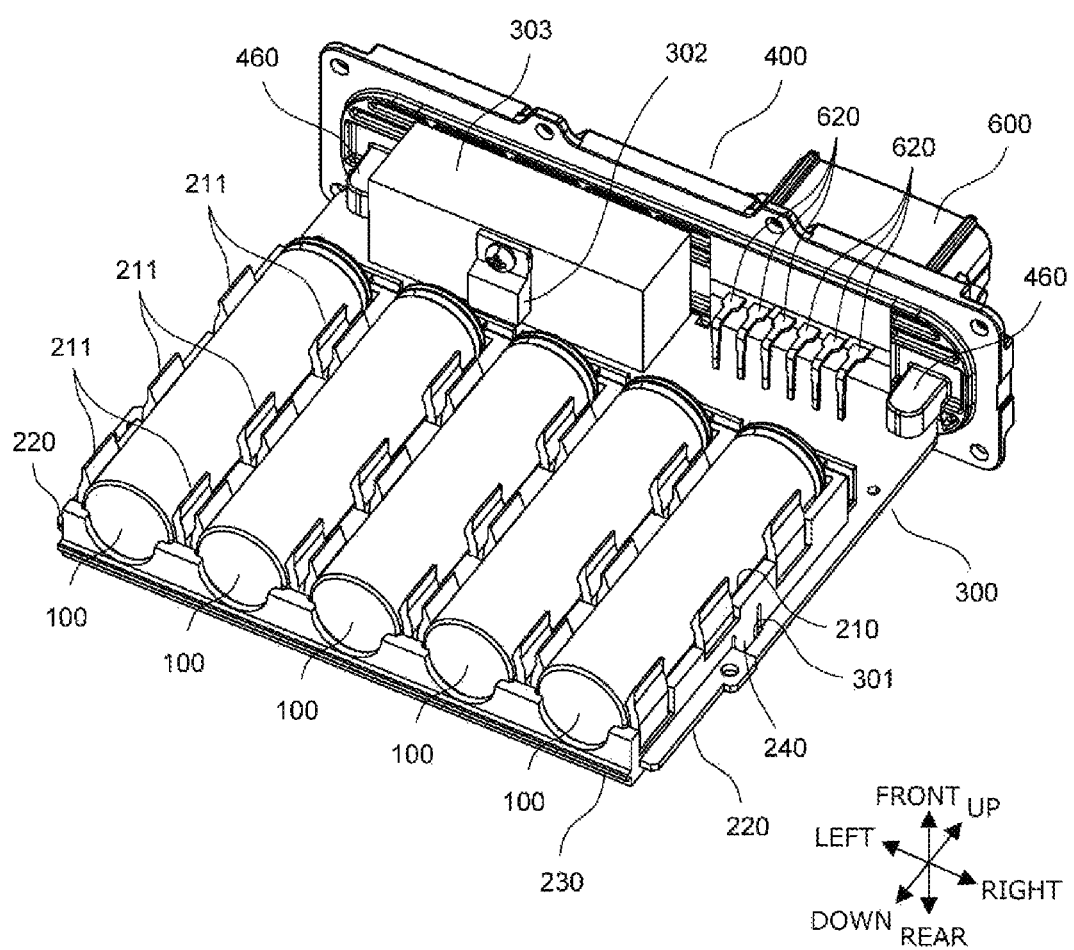
FIG. 3 is a perspective view, viewed from a down and front position, of electricity storage devices, a device holder, a circuit board, and the lid according to the exemplary embodiment, which are integrated into one body.

FIG. 3 is a perspective view, viewed from a down and front position, of electricity storage devices 100, device holder 200, circuit board 300, and lid 400 according to the present exemplary embodiment, which are integrated into one body.

Electricity storage devices 100 are, for example, electric double-layer capacitors. Electricity storage devices 100 may be capacitors other than electric double-layer capacitors and may be, for example, lithium ion capacitors. Further, as an active material for positive electrodes of electricity storage devices 100, electroconductive polymer may be used. Examples of the electroconductive polymer include polyaniline, polypyrrole, or polythiophene or a derivative of these materials, or a plurality of types of electroconductive polymers may be used.

Each electricity storage device 100 includes: container 110 that has an elongated bottomed cylindrical shape; sealing body 120 that seals an opening of container 110; and positive electrode lead terminal 130 and negative electrode lead terminal 140 that are drawn out through sealing body 120. Container 110 houses a device element and an electrolyte solution (both not shown). Sealing body 120 is made of an elastic material containing a rubber component. Positive electrode lead terminal 130 is electrically connected to a positive electrode of the device element, and negative electrode lead terminal 140 is electrically connected to a negative electrode of the device element.

Device holder 200 is made of a resin material such as polybutylene terephthalate (PBT) or polyphenylenesulfide (PPS).

Device holder 200 includes five containers 210 arranged in a right-left direction in a row to hold five electricity storage devices 100 arranged in the right-left direction. Each container 210 is recessed in a semi-arc shape so as to contain a half of a peripheral surface of electricity storage device 100. Each container 210 has a pair of claw parts 211 provided at each of three places in an up-down direction. Each claw part 211 extends toward inside of container 210, being curved to have the same curvature as a circular arc-shaped holding surface of container 210. Also at each of two places on the holding surface of each container 210, a pair of claw parts (not shown) are formed. Electricity storage devices 100 are each held in individual containers 210, being pinched by the pairs of claw parts 211 at the three places and the pairs of claw parts at the two places.

On each of right and left side surfaces of device holder 200, insertion rib 220 is formed to extend in the up-down direction. Further, on a bottom surface of device holder 200, insertion rib 230 is formed to extend in the right-left direction.

Circuit board 300 has a substantially rectangular shape having a long side extending in the right-left direction. Device holder 200 is fixed on circuit board 300 by a so-called snap fit structure in which claw parts 240 each having a hook-shaped tip are respectively provided on lateral side surfaces of device holder 200, and are respectively inserted in mounting holes 301 of circuit board 300. Device holder 200 and circuit board 300 overlap each other in a front-rear direction such that an upper part of circuit board 300 protrudes upward and a lower part of device holder 200 protrudes downward.

Circuit board 300 has wiring patterns (not shown) formed to serially or parallelly connect five electricity storage devices 100. Positive electrode lead terminals 130 and negative electrode lead terminals 140 of electricity storage devices 100 are solder-connected to wiring patterns. Further, on circuit board 300, a charging circuit (not shown) is disposed to charge electricity storage devices 100 with electric power supplied from an external battery or other power source. Note that FIGS. 2 and 3 show field effect transistor (FET) 302 included in the charging circuit and heatsink 303 to dissipate heat from FET 302.

Figure 4A:
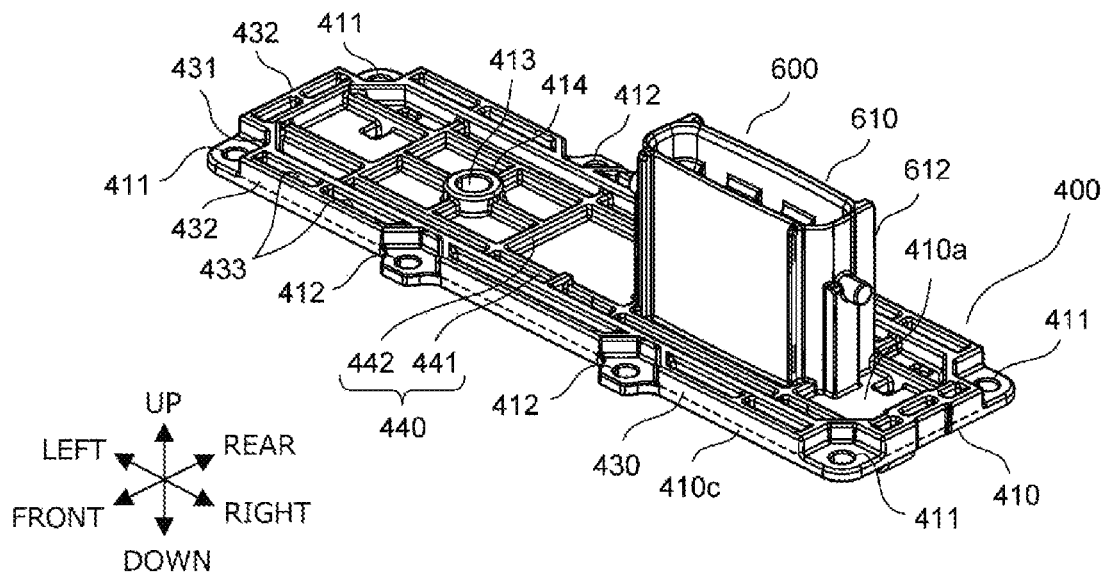
FIG. 4A is a front perspective view illustrating the lid according to the exemplary embodiment, on which a connector is integrally formed.
Figure 4B:
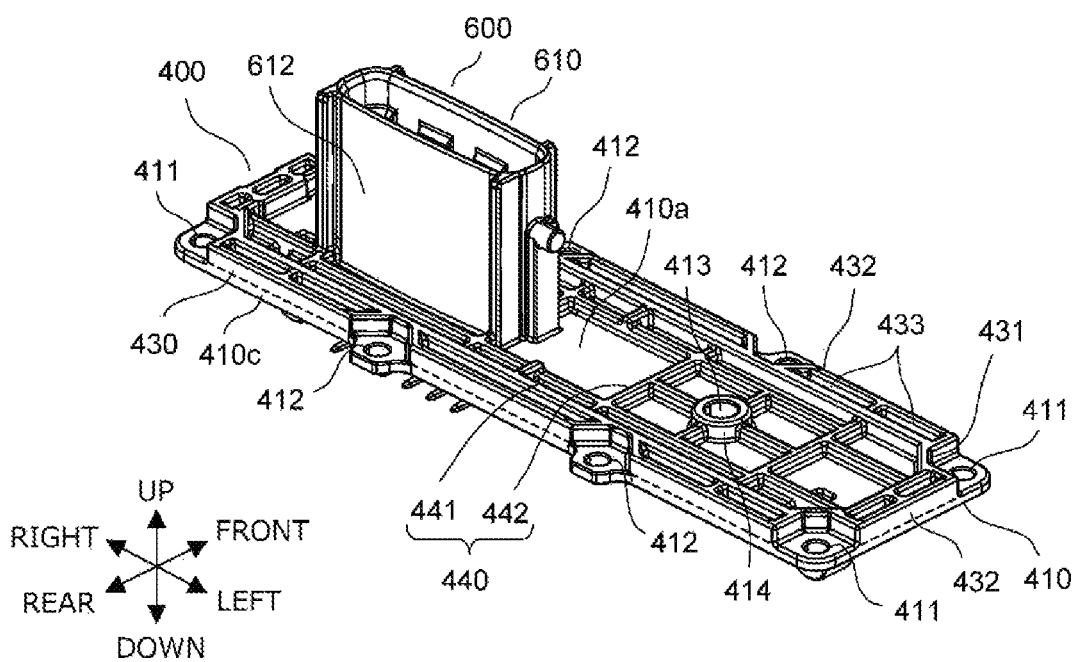
FIG. 4B is a rear perspective view illustrating the lid according to the exemplary embodiment, on which the connector is integrally formed.
Figure 4C:
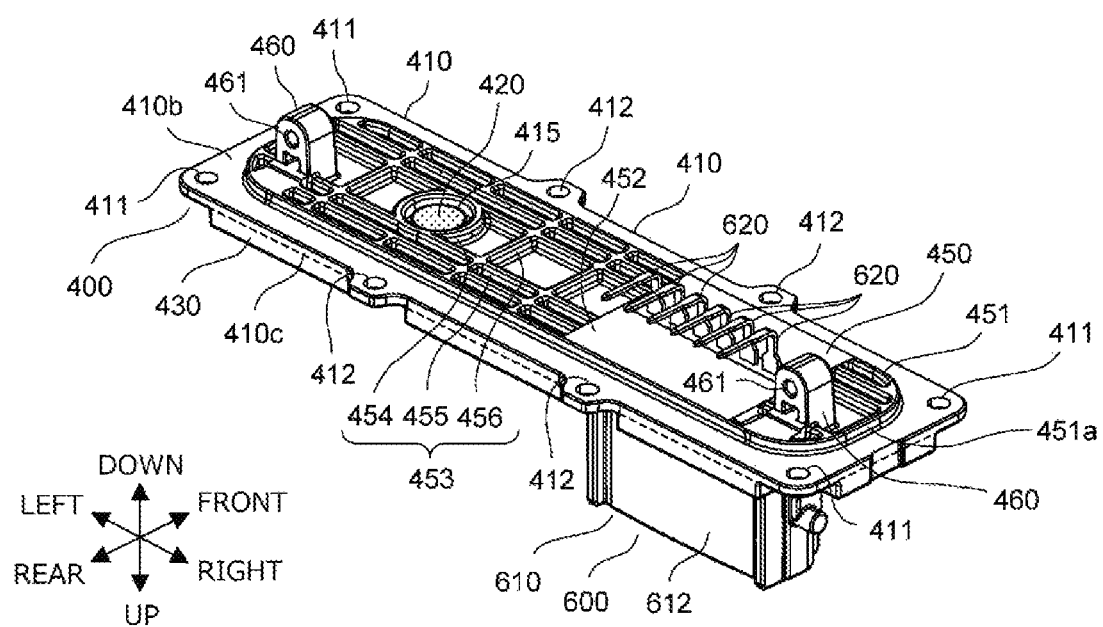
FIG. 4C is a bottom perspective view illustrating the lid according to the exemplary embodiment, on which the connector is integrally formed.
Figure 5:
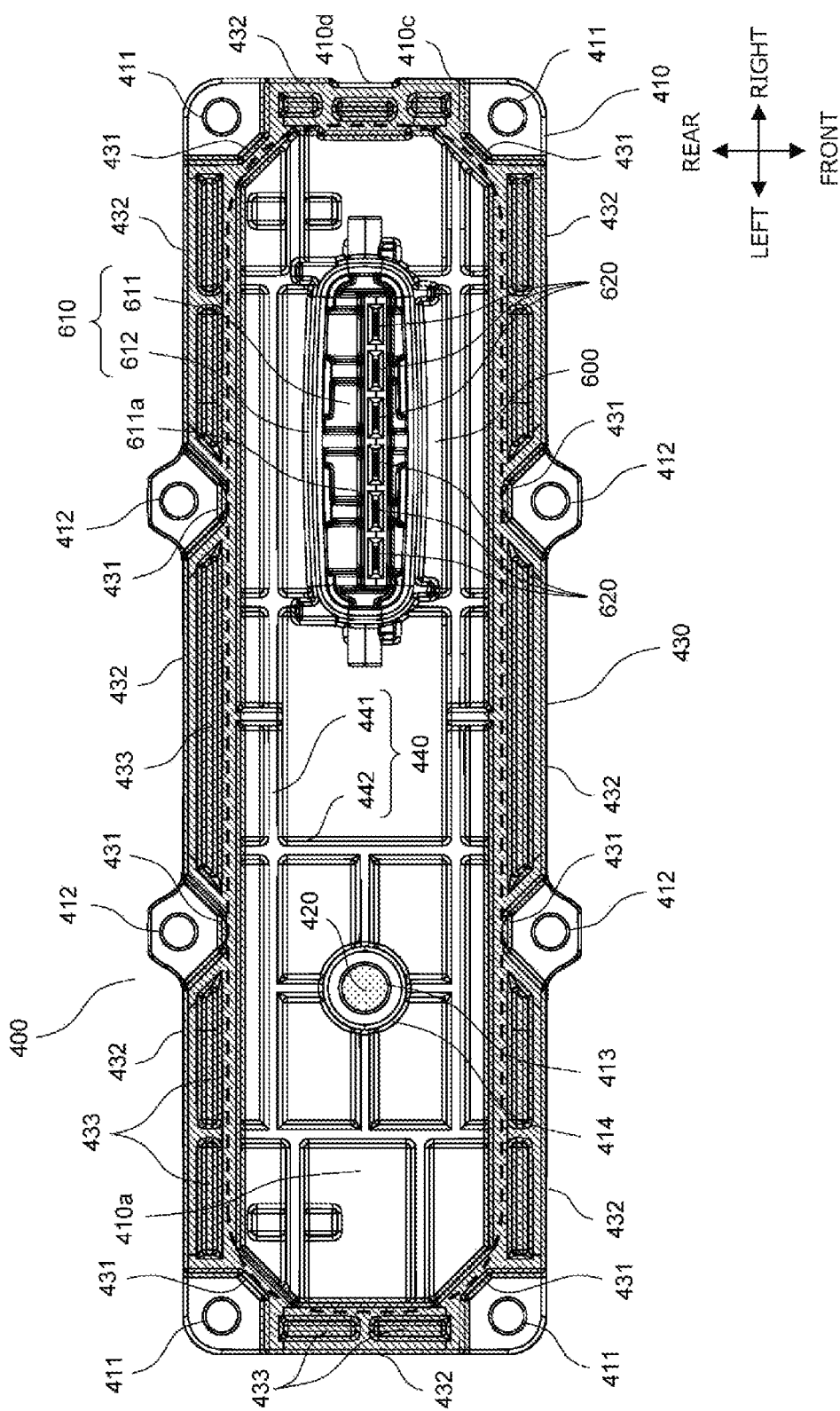
FIG. 5 is a plan view of the lid according to the exemplary embodiment, on which the connector is integrally formed.

FIGS. 4A to 4C are respectively a front perspective view, a rear perspective view, and a bottom perspective view of lid 400 according to the present exemplary embodiment on which connector 600 is integrally formed. FIG. 5 is a plan view illustrating lid 400 according to the present exemplary embodiment, on which connector 600 is integrally formed. Note that, in FIGS. 4A to 4C, a boundary between peripheral surface 410c of main body part 410 and projection part 430 is represented by a broken line, for the sake of convenience. In FIG. 5, projection part 430 is hatched, for the sake of convenience. In FIG. 5, a position of gasket 800, when lid 400 is attached to case 500, is represented by a broken line.

Lid 400 is made of a resin material such as polybutylene terephthalate (PBT) or polyphenylenesulfide (PPS). Lid 400 includes main body part 410 having a substantially rectangular plate shape that has a long side extending in the right-left direction. Main body part 410 is configured with: top surface 410a; bottom surface 410b; and peripheral surface 410c that is constituted by side surfaces on the front, rear, left, and right and is perpendicular to top surface 410a and bottom surface 410b. In addition, four corner parts of main body part 410 on the front, rear, left, and right have a round shape. Note that recessed part 410d is formed in the right-side surface of peripheral surface 410c.

In each corner part of main body part 410, there is formed a circular corner mounting hole 411. Further, on each of the front side and the rear side of main body part 410, there are formed two circular intermediate mounting holes 412 between two corner mounting holes 411 arranged in the right-left direction, which is a longitudinal direction. Parts of a front-end edge of main body part 410 surrounding two intermediate mounting holes 412 each protrude forward in a trapezoidal shape, and parts of a rear-end edge of main body part 410 surrounding two intermediate mounting holes 412 each protrude rearward in a trapezoidal shape.

Circular ventilation hole 413 is formed in a region which is located at left side with respect to a center of main body part 410 in the right-left direction and at a center in the front-rear direction. Circular ring-shaped ribs 414, 415 are respectively formed in a surrounding area of ventilation hole 413 on top surface 410a and bottom surface 410b of main body part 410. Ventilation hole 413 is covered with gas-permeable film 420 attached to rib 415, from a side of bottom surface 410b. Gas-permeable film 420 is a member configured such that a water- and oil-repellent film is formed by stacking a PTFE porous film on a base material made of a polyethylene terephthalate (PET) nonwoven fabric or woven fabric on which a water- and oil-repellent treatment is performed. Gas-permeable film 420 has a water-repellent property and an air-permeable property.

On top surface 410a of main body part 410 of lid 400, there is formed projection part 430 having a substantially rectangular frame shape such that projection part 430 is located along an outer peripheral edge of main body part 410 and protrudes from top surface 410a (see FIG. 5). Projection part 430 includes: narrow parts 431 that are small in width to get around corner mounting holes 411 and intermediate mounting holes 412; and wide parts 432 that are large in width and are parts other than narrow parts 431. In each of wide parts 432, there is provided thinned part 433 that is a recessed part. Lid 400 further has, in an inner area of projection part 430 on top surface 410a of main body part 410, rib group 440 provided to protrude from top surface 410a. Rib group 440 is configured with a combination of a plurality of ribs 441 extending in the right-left direction and a plurality of ribs 442 extending in the front-rear direction, and is connected to projection part 430, rib 414 of ventilation hole 413, and connector 600. A height of a rib group 440 is made lower than a height of projection part 430.

On bottom surface 410b of main body part 410, which is a rear side of lid 400, lid 400 has inner lid part 450 provided to rise wholly from bottom surface 410b. Inner lid part 450 has a shape corresponding to a shape of opening part 506 of case 500, in other words, a rectangular shape having four corner parts having a large curvature, and when lid 400 is mounted on case 500, lid 400 enters inside inner peripheral wall surface 507 of case 500. Inner lid part 450 includes outer peripheral rib 451 in an annular shape that forms an outer peripheral edge part of inner lid part 450. Inner lid part 450 further includes, inside of outer peripheral rib 451, thick part 452 in a quadrangular shape that makes an area on a rear side of connector 600 thicker, and inner lid part 450 has rib group 453 in an area other than thick part 452. Rib group 453 is configured with: a combination of rib 454 in an annular shape surrounding rib 415 of ventilation hole 413; a plurality of ribs 455 extending in the right-left direction; and a plurality of ribs 456 extending in the front-rear direction, and rib group 453 is connected to outer peripheral rib 451 and thick part 452. Outer peripheral surface 451a of outer peripheral rib 451 is perpendicular to bottom surface 410b of main body part 410 and is connected to bottom surface 410b.

Lid 400 is provided with mounting bosses 460 each on one of right and left end parts of inner lid part 450. In each of mounting bosses 460, there is formed screw hole 461 that is opened rearward.

Connector 600 is integrally formed with lid 400 and includes housing 610 and a plurality of terminals 620. Housing 610 has a substantially rectangular parallelepiped box shape that is longer in the right-left direction and whose upper face is opened. A part of main body part 410 of lid 400 is used also as bottom surface part 611 of housing 610. Peripheral surface part 612 constituted by side surfaces on front, rear, right, and left sides of housing 610 protrudes from top surface 410a of main body part 410 of lid 400. The plurality of terminals 620 are embedded, by insert molding, in bottom surface part 611 of housing 610 while being arranged in the right-left direction. One end side of each terminals 620 is located inside housing 610, and the other end side protrudes from inner lid part 450 on a rear side of lid 400. The other end side of each terminal 620 is bent substantially in an L shape. Bottom surface part 611 of housing 610 is raised in surrounding area 611a of terminals 620 such that a part holding terminals 620 is thicker.

Since connector 600 is integrally formed with lid 400 as described above, there is no boundary created between housing 610 of connector 600 and lid 400. Therefore, unlike the case of a conventional configuration where a through-hole is provided in a lid to expose a connector to the outside through the through-hole, there is no worry about water entering through the boundary between the connector and the through-hole.

As shown in FIG. 3, lid 400 is fixed to an upper end part of circuit board 300 in such a manner that two mounting bosses 460 on the rear side of lid 400 are attached to circuit board 300 with two screws (not shown). Terminals 620 of connector 600 are connected to the wiring patterns of circuit board 300. With this arrangement, five electricity storage devices 100 are electrically connected to terminals 620 for outputting electric power from electricity storage devices 100. Further, the charging circuit is electrically connected to terminals 620 to supply electric power from a battery to the charging circuit.

Figure 6A:
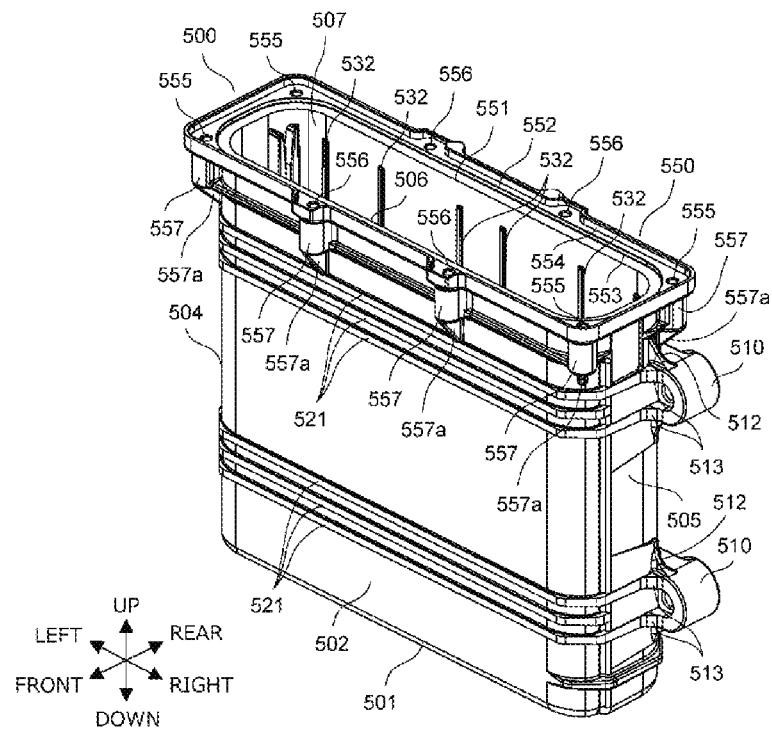
FIG. 6A is a front perspective view illustrating the case according to the exemplary embodiment before a gasket is formed.
Figure 6B:
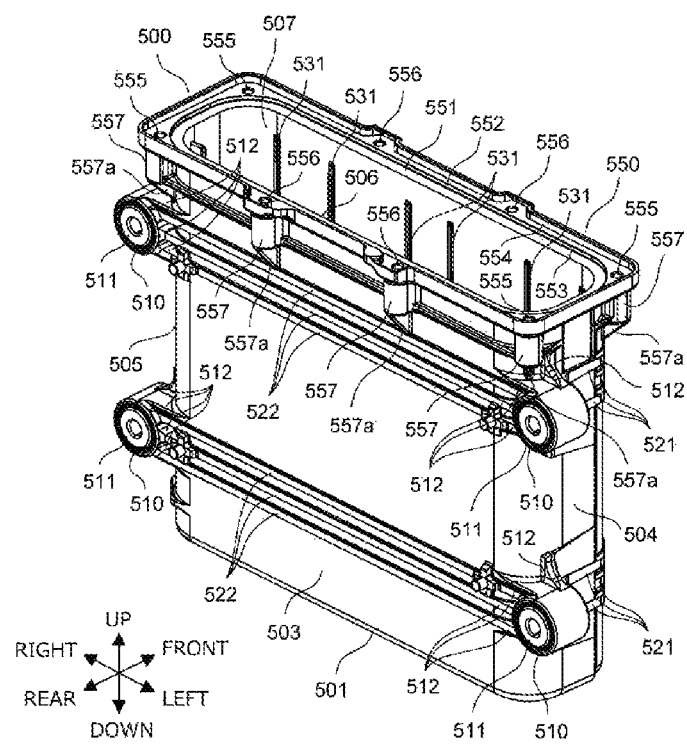
FIG. 6B is a rear perspective view illustrating the case according to the exemplary embodiment before a gasket is formed.
Figure 7A:
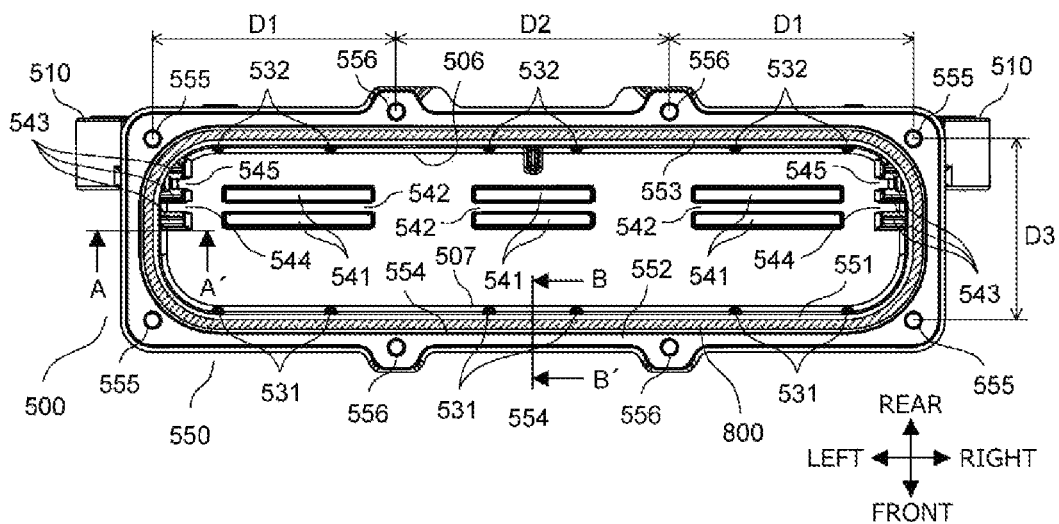
FIG. 7A is a plan view illustrating the case according to the exemplary embodiment.
Figure 7B:
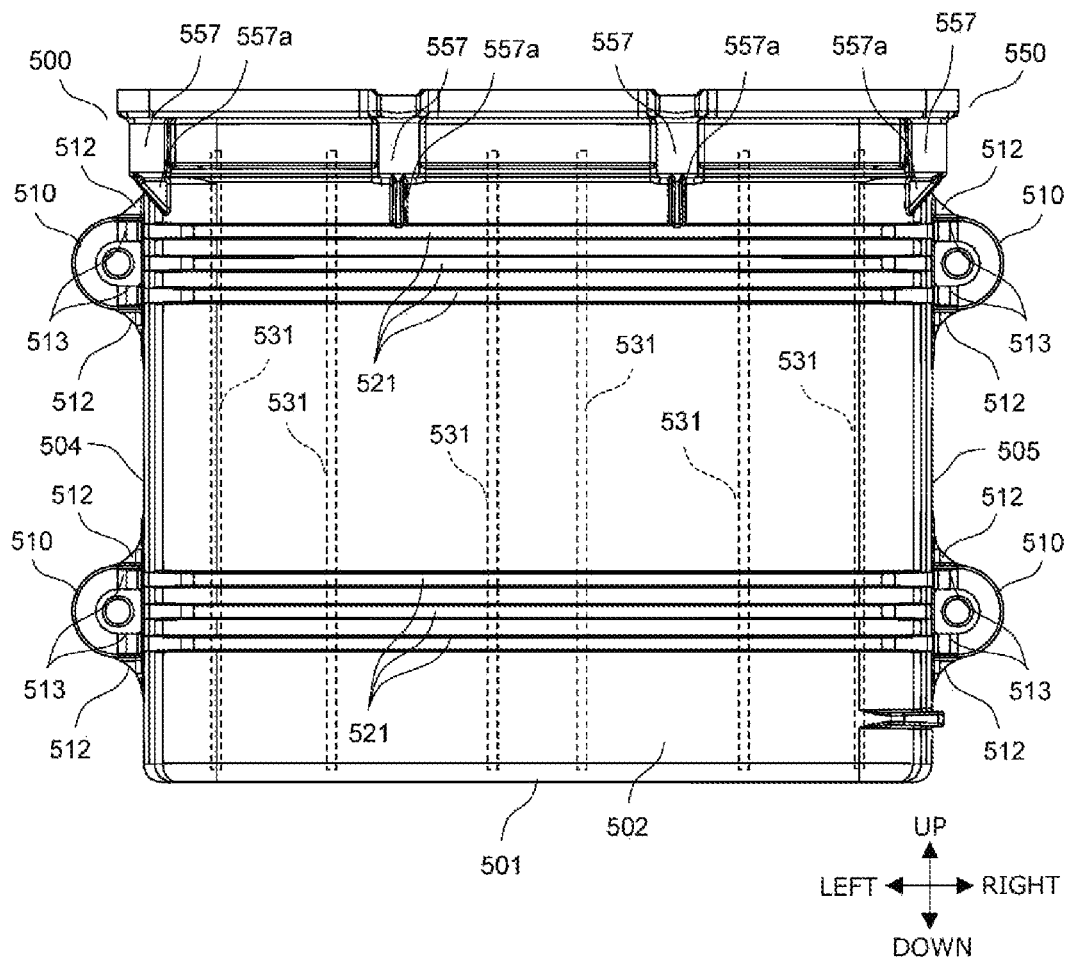
FIG. 7B is a front view illustrating the case according to the exemplary embodiment.
Figure 8A:
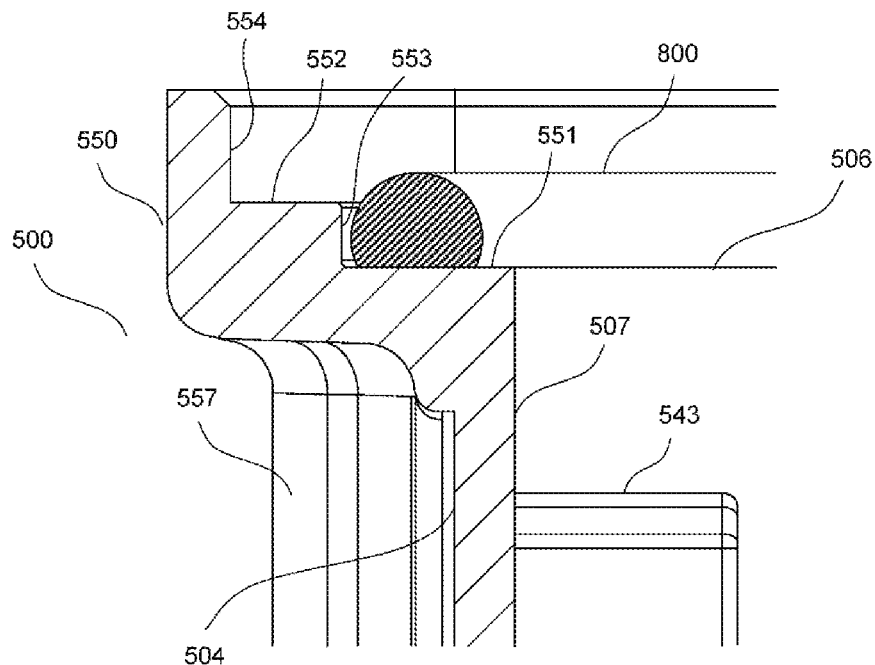
FIG. 8A is a partially enlarged cross-sectional view illustrating the case according to the exemplary embodiment taken along line A-A' of FIG. 7A.
Figure 8B:
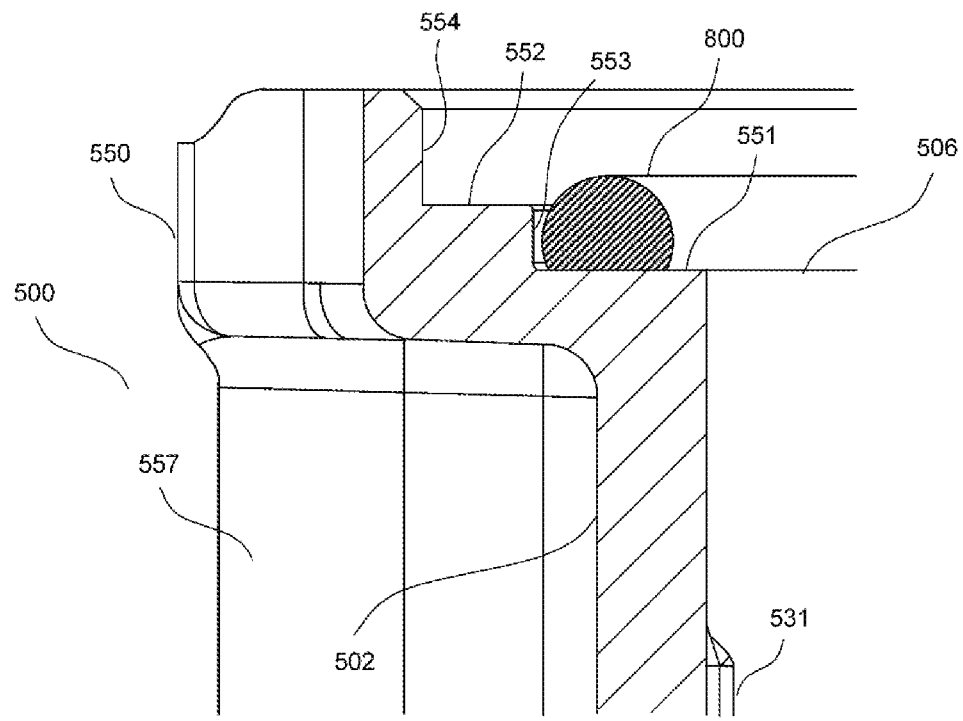
FIG. 8B is a partially enlarged cross-sectional view illustrating the case according to the exemplary embodiment taken along line B-B' of FIG. 7A.

FIGS. 6A and 6B are respectively a front perspective view and a rear perspective view illustrating case 500 according to the present exemplary embodiment before gasket 800 is formed. FIGS. 7A and 7B are respectively a plan view and a front view illustrating case 500 according to the present exemplary embodiment. FIG. 8A is a partially enlarged cross-sectional view illustrating case 500 according to the present exemplary embodiment taken along line A-A' of FIG. 7A, and FIG. 8B is a partially enlarged cross-sectional view illustrating case 500 according to the present exemplary embodiment taken along line B-B' of FIG. 7A. Note that, in FIG. 7A, gasket 800 is hatched for the sake of convenience.

Case 500 is made of a resin material such as polybutylene terephthalate (PBT) or polyphenylenesulfide (PPS). Case 500 is formed in a substantially rectangular parallelepiped box shape that is wide in the right-left direction and thin in the front-rear direction, includes bottom surface part 501, front-side face part 502, rear-side face part 503, left-side face part 504, and right-side face part 505, and has opening part 506 on an upper end face. Four corner parts, of case 500, between individual side face parts 502 to 505 are formed in a large round shape. Due to this configuration, shapes of bottom surface part 501 and opening part 506 of case 500 are made in a rectangular shape having four corner parts having a large curvature.

On an upper part and a lower part of each of the corner part between left-side face part 504 and rear-side face part 503 and the corner part between right-side face part 505 and rear-side face part 503, there is provided mounting boss 510 in a substantially cylindrical shape, which is directed rearward. In each mounting boss 510, there is embedded metal nut 511 having a cylindrical shape. Further, on a peripheral surface of each mounting boss 510, there is formed five ribs 512 for reinforcement connected to the corner part; and on an end face of each mounting boss 510, there is formed two ribs 513 for reinforcement connected to left-side face part 504 or right-side face part 505.

On each of upper and lower front sides of an outer wall surface of case 500, there are formed three laterally extending ribs 521 for reinforcement, and, on each of upper and lower rear sides of the outer wall surface of case 500, there is formed three laterally extending ribs 522 for reinforcement. Upper and lower ribs 521 of each three ribs 521 on the front side are provided over front-side face part 502, left-side face part 504, and right-side face part 505, and both end parts of such two ribs 521 are connected to two ribs 513 of mounting boss 510. Rib 521 on the center is provided over front-side face part 502 and the corner parts on the both sides of front-side face part 502. Each three ribs 522 at the rear side are provided at rear-side face part 503, and both end parts of each three ribs 522 are connected to three rib 512 of mounting boss 510. Further, inside of case 500, six ribs 531, 532 are respectively provided longitudinally (up-down direction), with appropriate intervals in the right-left direction, on an inner wall surface of front-side face part 502 and on an inner wall surface of rear-side face part 503, from an upper end to a lower end of the respective inner wall surfaces.

As described above, on front-side face part 502 and rear-side face part 503 of case 500, the plurality of ribs 521, 522 on the outer wall surface and plurality of ribs 531, 532 on the inner wall surface are provided in a lattice shape. Thus, it is possible to well reinforce front-side face part 502 and rear-side face part 503, which have larger area than left-side face part 504 and right-side face part 505, and as a result, case 500 are wholly well reinforced. In addition, since the plurality of ribs 521, 522, 531, and 532 constituting a lattice are provided separately on the outer wall surface and the inner wall surface, numbers of projections and depressions made on the outer wall surface of case 500 can be smaller, and foreign substance such as dust is less likely to attach to the outer wall surface. Further, since longitudinal ribs 531, 532 are provided on the inner wall surface of case 500, when case 500 is manufactured by molding, a molding die can be easily taken out from inside of case 500, so that a structure of the molding die can be avoided from being complicated.

Further, each two ribs 521 on the front side of the outer wall surface of case 500 are connected to ribs 513 of mounting boss 510, and each three ribs 522 on the rear side of the outer wall surface of case 500 are connected to ribs 512 of mounting boss 510. Thus, these ribs 521, 522 can be reinforced, so that case 500 can be better reinforced.

Inside of case 500, bottom surface holder fixing groves 542 are provided, by two ribs 541 extending in the right-left direction, separately at three positions in the right-left direction in an inner wall surface of bottom surface part 501. Further, on each of left-side face part 504 and right-side face part 505, there are side surface holder fixing groove 544 and substrate fixing groove 545 formed by three ribs 543 extending in the up-down direction. Bottom surface holder fixing groves 542 and side surface holder fixing grooves 544 are located at the same position in the front-rear direction. In a state where device holder 200 holding electricity storage devices 100 and circuit board 300 are housed in case 500, insertion ribs 220 on the side surfaces of device holder 200 are inserted in side surface holder fixing grooves 544, and insertion rib 230 on the bottom surface of device holder 200 is inserted in bottom surface holder fixing groves 542. Further, a left end part and a right end part of circuit board 300 are inserted in substrate fixing grooves 545 of left-side face part 504 and right-side face part 505. As a result, device holder 200 holding electricity storage devices 100 and circuit board 300 are fixed inside of case 500.

Note that inner peripheral wall surface 507 is constituted by inner wall surfaces of four side face parts 502, 503, 504, and 505 in the front, rear, right, and left sides of case 500.

Case 500 is provided with lid mounting part 550 to which lid 400 is attached, on an upper end part of case 500. Lid mounting part 550 is depressed in a shape corresponding to lid 400 such that lid mounting part 550 can contain lid 400. Lid mounting part 550 is provided on an outer periphery of opening part 506. Lid mounting part 550 includes inner edge surface 551, outer edge surface 552, inner peripheral surface 553, and outer peripheral surface 554. Inner edge surface 551 is directed to the same side as opening part 506, in other words, upward. Outer edge surface 552 is provided on an outer periphery of inner edge surface 551, and its height from bottom surface part 501 of case 500 is one step higher than inner edge surface 551. Inner peripheral surface 553 is connected to inner edge surface 551 and outer edge surface 552, and is perpendicular to these edge surfaces 551, 552. Outer peripheral surface 554 is provided on an outer periphery of outer edge surface 552, and is perpendicular to outer edge surface 552. Inner edge surface 551 has a belt shape that has a predetermined width and has the same shape as an outer shape of opening part 506. Outer edge surface 552 has the same outer shape as main body part 410 of lid 400. A depth of lid mounting part 550 to outer edge surface 552 is almost the same as a thickness of main body part 410 of lid 400, and a depth from outer edge surface 552 to inner edge surface 551 is smaller than a height of inner lid part 450 on the rear side of lid 400.

As shown in FIG. 7A, on inner edge surface 551 of lid mounting part 550, there is disposed gasket 800, which is a sealing member. Gasket 800 has a loop shape similar to a shape of inner edge surface 551. Gasket 800 is made of an ultraviolet curable elastic resin such as acrylic resin or silicone resin. Specifically, a highly viscous ultraviolet curable resin in a liquid form (gel form) is applied to inner edge surface 551 to be in a shape of gasket 800, and the applied ultraviolet curable resin is irradiated with ultraviolet to be cured, so that gasket 800 is completed while being strongly adhered to inner edge surface 551. As shown in FIGS. 8A and 8B, gasket 800 formed on inner edge surface 551 has an almost spherical surface shape on the upper side, and protrudes slightly upward above (for example, about 0.5 mm above) outer edge surface 552. Further, there is formed a small space between gasket 800 and inner peripheral surface 553.

Outer edge surface 552 is provided with corner screw holes 555 each formed at one of the four corner parts to have a circular shape. Further, on each of the front side and the rear side of outer edge surface 552, there are formed two circular intermediate screw holes 556 between two corner screw holes 555 arranged in the right-left direction, which is a longitudinal direction. Two intermediate screw holes 556 are provided at positions that are the same distance apart from a center of case 500 in the right-left direction. In this case, as shown in FIG. 7A, a distance D1 between one intermediate screw hole 556 and corner screw hole 555 closer to such intermediate screw hole 556 is made smaller than a distance D2 between two intermediate screw holes 556. In other words, two intermediate screw holes 556 are not equidistantly arranged in a longitudinal direction of case 500 so that two distances D1, D2 are the same, but two intermediate screw holes 556 are arranged to be slightly closer to the corner parts. Further, a distance D3 between two corner screw holes 555 arranged in the front-rear direction, which is the short direction, is made shorter than the distance D1 between intermediate screw hole 556 and corner screw hole 555.

Parts of, a front-end edge of outer edge surface 552, surrounding two intermediate screw holes 556 protrude forward in a trapezoidal shape, and parts of, a rear-end edge of outer edge surface 552, surrounding two intermediate screw holes 556 protrude rearward in a trapezoidal shape. Lid mounting part 550 has mounting bosses 557 each provided at a position of one of screw holes 555, 556, and screw holes 555, 556 extend inside of mounting bosses 557. Each mounting boss 557 is provided with rib 557a formed for reinforcement. Ribs 557a of two mounting bosses 557 closer to front-side face part 502 are connected to rib 521 of front-side face part 502. Ribs 557a of two mounting bosses 557 closer to rear-side face part 503 are connected to rib 522 of rear-side face part 503.

Device holder 200 holding electricity storage devices 100 and circuit board 300 are housed in case 500, and lid 400 is attached on lid mounting part 550 of case 500. Corner mounting holes 411 and intermediate mounting holes 412 of lid 400 are respectively fit together with individual corner screw holes 555 and intermediate screw holes 556 of case 500. Screws 700 inserted through corner mounting holes 411 and intermediate mounting holes 412 are respectively fixed to individual corner screw holes 555 and intermediate screw holes 556. With this arrangement, lid 400 is fixed to case 500, and opening part 506 of case 500 is closed with lid 400. In this manner, electricity storage module 1 is assembled.

Figure 9:
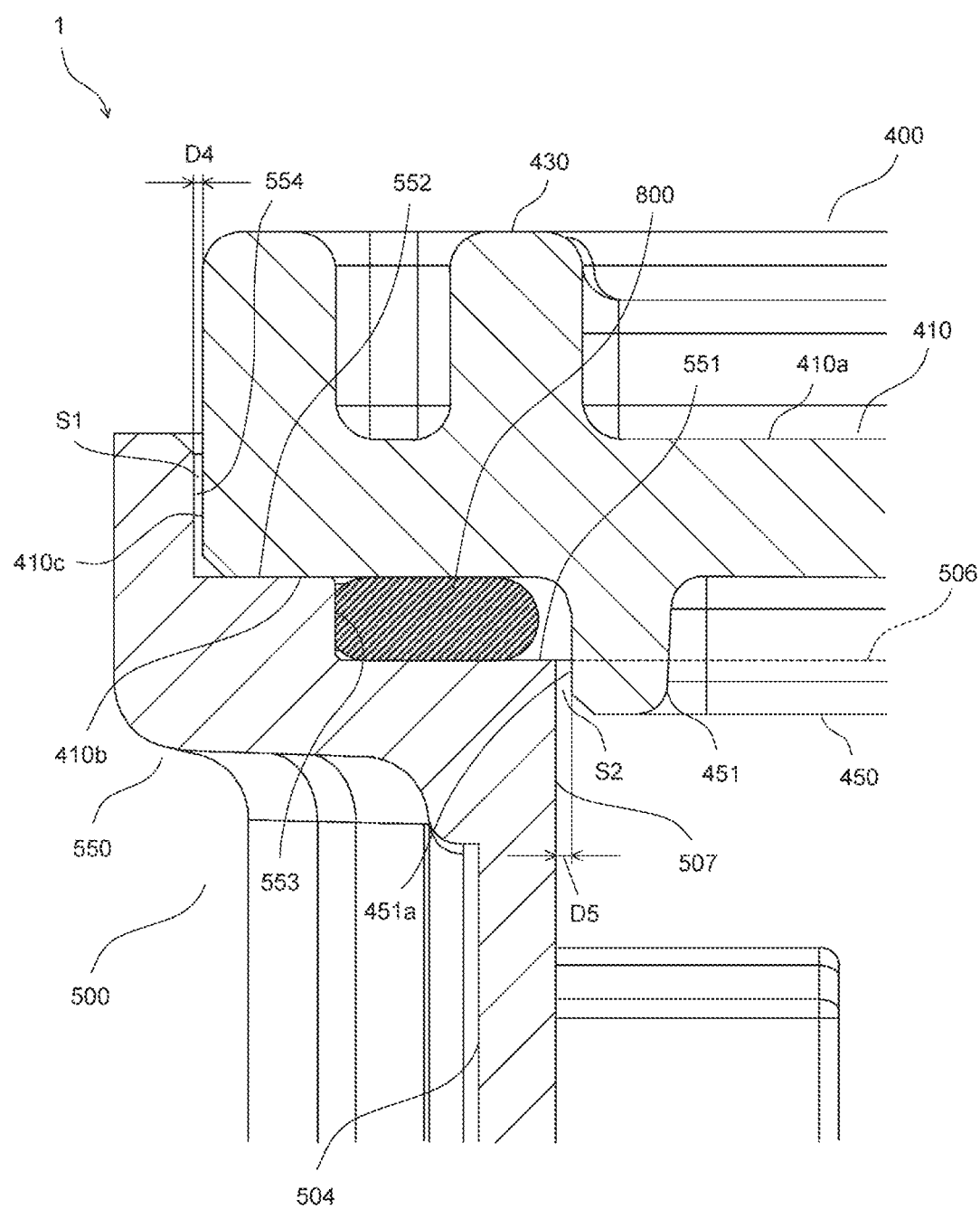
FIG. 9 is a partially enlarged cross-sectional view illustrating the electricity storage module according to the exemplary embodiment taken at the same position as line A-A' of FIG. 7A.
Figure 10:
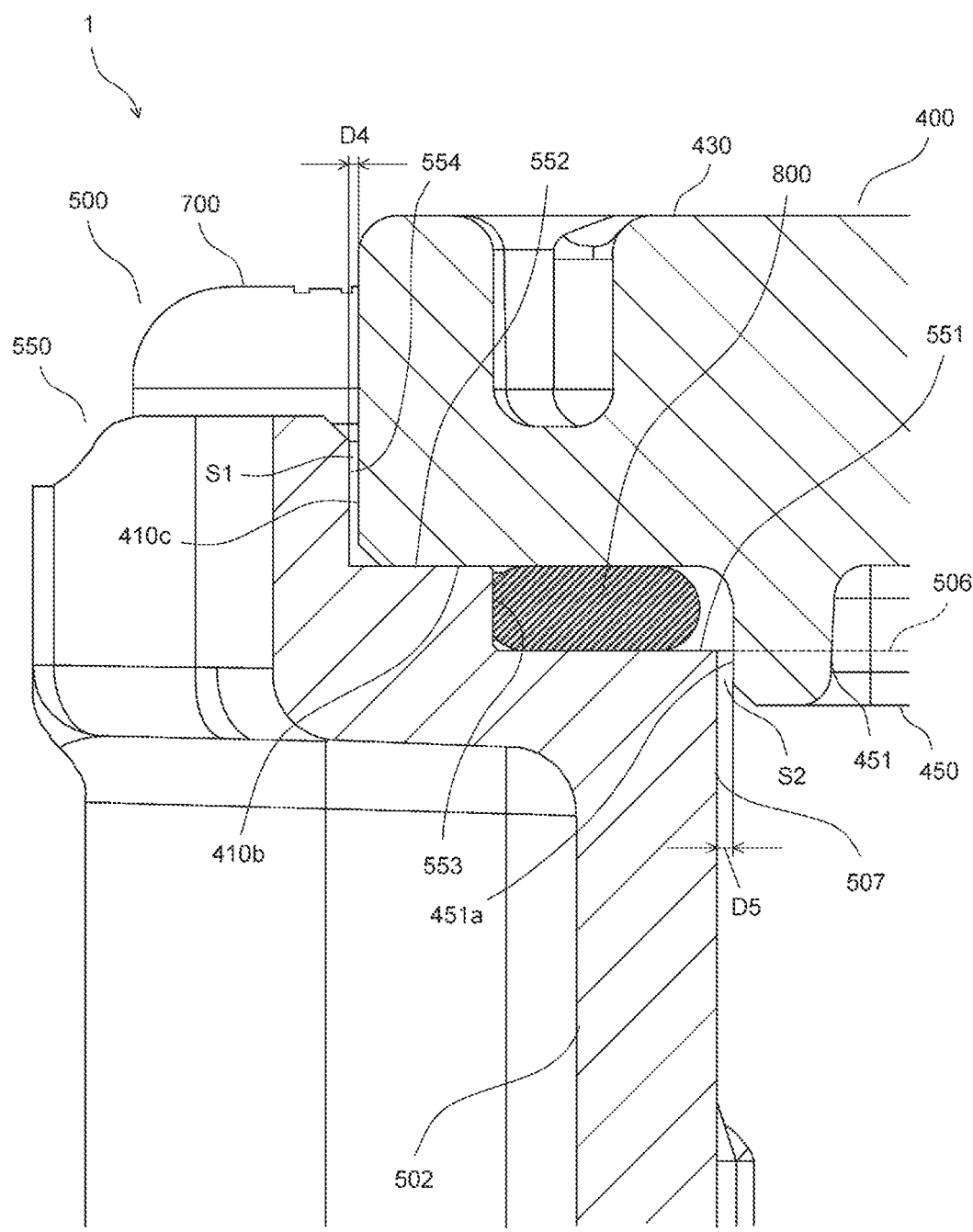
FIG. 10 is a partially enlarged cross-sectional view illustrating the electricity storage module according to the exemplary embodiment taken at the same position as line B-B' of FIG. 7A.

FIG. 9 is a partially enlarged cross-sectional view illustrating electricity storage module 1 according to the present exemplary embodiment taken at the same position as line A-A' of FIG. 7A. FIG. 10 is a partially enlarged cross-sectional view illustrating electricity storage module 1 according to the present exemplary embodiment taken at the same position as line B-B' of FIG. 7A. Note that FIGS. 9 and 10 do not show device holder 200, circuit board 300, and electricity storage devices 100 for the sake of convenience.

In a state where lid 400 is attached to case 500, bottom surface 410b of lid 400 and inner edge surface 551 of case 500 face each other, and gasket 800 is disposed between bottom surface 410b of lid 400 and inner edge surface 551 of case 500. Further, bottom surface 410b of lid 400 is in contact with outer edge surface 552. Gasket 800 is compressed and deformed by a force between bottom surface 410b of lid 400 and inner edge surface 551 of case 500. As described above, by being applied to inner edge surface 551 in a gel form, gasket 800 is strongly adhered to inner edge surface 551. Thus, an adhesion strength between gasket 800 and inner edge surface 551 is greater than an adhesion strength between gasket 800 and bottom surface 410b of lid 400. Gasket 800 is located between inner peripheral surface 553 of case 500 and outer peripheral surface 451a of outer peripheral rib 451 of lid 400 that faces inner peripheral surface 553. And gasket 800 is in contact with inner peripheral surface 553, but is not in contact with outer peripheral surface 451a of outer peripheral rib 451 (gasket 800 is apart from outer peripheral surface 451a).

Note that, it is possible to see which is greater, the adhesion strength between gasket 800 and inner edge surface 551 or the adhesion strength between gasket 800 and bottom surface 410b of lid 400, on the basis of which of lid 400 or case 500 gasket 800 is adhered to when lid 400 is removed from case 500. In the present exemplary embodiment, since the adhesion strength between gasket 800 and inner edge surface 551 is greater than the adhesion strength between gasket 800 and bottom surface 410b of lid 400, gasket 800 is adhered to case 500 when lid 400 is removed from case 500.

Outer peripheral surface 554 of case 500 faces peripheral surface 410c of lid 400 from outside, and inner peripheral wall surface 507 of case 500 faces outer peripheral surface 451a of outer peripheral rib 451 of lid 400 from outside. Space S1 is provided between outer peripheral surface 554 of case 500 and peripheral surface 410c of lid 400, and space S2 is provided between inner peripheral wall surface 507 of case 500 and outer peripheral surface 451a of outer peripheral rib 451 of lid 400. As a whole (except a space at a part of recessed part 410d of peripheral surface 410c), a distance D4 between outer peripheral surface 554 of case 500 and peripheral surface 410c of lid 400 is made shorter than a distance D5 between inner peripheral wall surface 507 of case 500 and outer peripheral surface 451a of outer peripheral rib 451 of lid 400.

Note that space S1 does not have to be provided along an entire periphery between outer peripheral surface 554 of case 500 and peripheral surface 410c of lid 400, and outer peripheral surface 554 of case 500 and peripheral surface 410c of lid 400 may be in contact with each other at some part. In a similar way, space S2 does not have to be provided along an entire periphery between inner peripheral wall surface 507 of case 500 and outer peripheral surface 451a of outer peripheral rib 451 of lid 400, but inner peripheral wall surface 507 of case 500 and outer peripheral surface 451a of outer peripheral rib 451 of lid 400 may be in contact with each other at some part.

Since vicinity part of the outer peripheral edge of lid 400 (main body part 410) presses gasket 800 with bottom surface 410b of lid 400, the vicinity part receives an elastic force from gasket 800. Thus, on the vicinity part of the outer peripheral edge of lid 400, there is formed projection part 430 as represented by the broken line of FIG. 5 such that, when lid 400, that is, opening part 506 of case 500 is viewed from the front, projection part 430 is located along gasket 800, more specifically, overlaps gasket 800 from right above. A part of lid 400 corresponding to projection part 430 is thicker than the thickness of main body part 410. This arrangement prevents deformation of lid 400 due to the elastic force of gasket 800.

When electricity storage module 1 is mounted on an external device provided in a vehicle or the like, the side of rear-side face part 503 of case 500 is fixed to a fixing part of the external device by screwing in mounting bosses 510. In addition, a connector (not shown) provided on the external device is connected to connector 600 of electricity storage module 1. When electric power needs to be assisted or backed up on the external device side, electric power having been output from five electricity storage devices 100 is supplied to the external device through connector 600 and the connector of the external device.

If temperature rises in case 500 due to heat generation in electricity storage devices 100 while being used or other causes, air in case 500 gets expanded. At this time, the expanded air passes through gas-permeable film 420 and escapes outside through ventilation hole 413, and an internal pressure of case 500 can therefore be prevented from increasing. On the other hand, even when water enters through ventilation hole 413, the water cannot pass through gas-permeable film 420. Hence, water is prevented from entering inside case 500.

Advantageous Effects of the Exemplary Embodiment

In the above, electricity storage module 1 of the present exemplary embodiment has been described. Electricity storage module 1 of the present exemplary embodiment can provide the following effects.

By disposing gasket 800 between inner edge surface 551 of case 500 and bottom surface 410b of lid 400, it is possible to improve water-tightness between case 500 and lid 400. With this effect, even when water splashes on electricity storage module 1 and enters through the boundary between case 500 and lid 400, gasket 800 can prevent the water from entering inside case 500.

Further, bottom surface 410b of lid 400 is in contact with outer edge surface 552, which is higher than inner edge surface 551 of case 500, so that outer edge surface 552 of case 500 can receive bottom surface 410b of lid 400. This arrangement can prevent gasket 800 from being unnecessarily pressed by lid 400, and thus damage of gasket 800 or other troubles can be suppressed.

Further, since gasket 800 is in contact with inner peripheral surface 553 of case 500, a water-tight part in a water entering path along inner peripheral surface 553 and inner edge surface 551 to an inside of case 500 can be made longer. This arrangement can further improve water-tightness between case 500 and lid 400.

Further, since outer peripheral surface 451a of outer peripheral rib 451 of lid 400 is not in contact with gasket 800 (outer peripheral surface 451a is apart from gasket 800), gasket 800 is not likely to receive stress form outer peripheral surface 451a even if vibration in a direction in which outer peripheral surface 451a and gasket 800 faces each other occurs on electricity storage module 1. Hence, damage of gasket 800 due to influence of the stress from outer peripheral surface 451a can be suppressed.

Further, space S1 is provided between outer peripheral surface 554 of case 500 and peripheral surface 410c of lid 400, and space S2 is provided between inner peripheral wall surface 507 of case 500 and outer peripheral surface 451a of outer peripheral rib 451 of lid 400. Thus, lid 400 can be easily attached to case 500. Furthermore, the distance D4 between outer peripheral surface 554 of case 500 and peripheral surface 410c of lid 400 is shorter than the distance D5 between inner peripheral wall surface 507 of case 500 and outer peripheral surface 451a of outer peripheral rib 451 of lid 400. In other words, the distance D5 is made longer than the distance D4. Hence, water is not likely to enter to reach a vicinity of gasket 800 through a space (space S1) between outer peripheral surface 554 of case 500 and peripheral surface 410c of lid 400. In addition, even if gasket 800 may be disposed close to inner peripheral wall surface 507 of case 500 in inner edge surface 551 of case 500 due to production error or other causes, outer peripheral surface 451a of outer peripheral rib 451 of lid 400 is not likely to be in contact with gasket 800.

Further, projection part 430 is formed on top surface 410a of lid 400 such that projection part 430 is located along gasket 800, so that the part of lid 400 that receives elastic force of gasket 800 is made thicker. Hence, it is possible to prevent deformation of lid 400 due to the elastic force of gasket 800, and it is thus possible to prevent the water-tightness between lid 400 and case 500 from decreasing due to deformation of lid 400. In addition, since entirety of lid 400 is not made thick, fluidity of resin (for example, PBT) is not impaired when lid 400 is molded, so that lid 400 can be preferably manufactured. In the meantime, since an amount of resin to be used for lid 400 can be reduced, material cost can be reduced. In particular, since projection part 430 is provided to overlap gasket 800 when opening part 506 of case 500 is viewed from the front, lid 400 can be more effectively reinforced, and deformation of lid 400 can be effectively suppressed.

Further, since gasket 800 is formed of ultraviolet curable resin, it is possible to easily assemble gasket 800 to inner edge surface 551 of case 500 by applying ultraviolet curable resin in a gel form to inner edge surface 551 of case 500 so as to form the shape of gasket 800 and then by curing the resin. Note that, when a loop-shaped gasket made of rubber material or the like, which is previously completed, is used, it is not easy to assemble the loop-shaped gasket to inner edge surface 551 because a shape of the gasket is likely to change (the shape is barely consistently maintained).

Further, when electricity storage module 1 is installed with lid 400 facing upward, water is likely to enter through the space between outer peripheral surface 554 of case 500 and peripheral surface 410c of lid 400, which is the boundary between case 500 and lid 400. At this time, due to the gravity, the water having entered is more likely to move to the boundary between inner edge surface 551 of case 500 and gasket 800, which is at the lower side, than to the boundary between bottom surface 410b of lid 400 and gasket 800, which is at the upper side. In the present exemplary embodiment, since the adhesion strength between inner edge surface 551 of case 500 and gasket 800 is higher than the adhesion strength between bottom surface 410b of lid 400 and gasket 800, it is possible to well stop the water moving to the boundary between inner edge surface 551 of case 500 and gasket 800.

Further, corner screw holes 555 are provided in the four corner parts of lid mounting part 550 of case 500. Four screws 700 respectively corresponding to corner screw holes 555 are fastened so that four corner parts of lid 400 can be pressed against case 500. Noted that four corner parts of lid 400 are most easily floated from case 500 due to the elastic force of gasket 800. Further, in the longitudinal direction of case 500, two intermediate screw holes 556 are provided between two corner screw holes 555 on each of the front edge part and the rear edge part of case 500. Since two intermediate screw holes 556 are not evenly disposed but disposed closer to the right and left corner parts, respectively, four screws 700 corresponding to intermediate screw holes 556 can firmly press vicinities of the right and left corner parts on each of the front and left edge parts of lid 400 down to case 500. Noted that the elastic force of gasket 800 is strong in the vicinities of the right and left corner parts. As described above, since lid 400 can be pressed against case 500 with a good balance by fastening eight screws 700 in consideration of the elastic force of gasket 800, water-tightness with gasket 800 between lid 400 and case 500 can be well maintained.

Although the exemplary embodiment of the present disclosure has been described above, the present disclosure is not limited to the exemplary embodiment described above, and moreover, a variety of modifications can also be applied to application examples according to the present disclosure other than the exemplary embodiment described above.

For example, in the above exemplary embodiment, gasket 800 made of ultraviolet curable resin is formed on inner edge surface 551 of case 500. Meanwhile, gasket 800 can be formed on bottom surface 410*b* of lid 400. In the case of the above configuration, after gasket 800 is formed on lid 400, lid 400 is attached to circuit board 300, and then a soldering step of terminals 620 of connector 600 and other steps are performed. Thus, since it takes some time before lid 400 is attached to case 500, it is concerned that foreign substance is likely to be attached to gasket 800. In contrast, in the case where gasket 800 is formed on inner edge surface 551 of case 500, lid 400 can be attached to case 500 in a short time after formation of gasket 800. For this reason, it is further preferable that gasket 800 be formed on the side of case 500.

In the above exemplary embodiment, gasket 800 made of ultraviolet curable resin is disposed between inner edge surface 551 of case 500 and bottom surface 410*b* of lid 400. Meanwhile, a gasket made of rubber material may be disposed between inner edge surface 551 of case 500 and bottom surface 410*b* of lid 400. Alternatively, instead of using the gasket using such an elastic body as described above, an adhesive may be disposed between inner edge surface 551 of case 500 and bottom surface 410*b* of lid 400. In this case, water-tightness between case 500 and lid 400 can be achieved by adhesion with the adhesive between inner edge surface 551 of case 500 and bottom surface 410*b* of lid 400. In this configuration, lid 400 and case 500 do not have to be fixed with screws 700, but lid 400 cannot be easily removed from case 500.

Further, in the above exemplary embodiment, corner screw holes 555 and intermediate screw holes 556 are provided in case 500, and lid 400 and case 500 are fixed to each other with screws 700 being screwed in corner screw holes 555 and intermediate screw holes 556. Meanwhile, fixing parts different from corner screw holes 555 and intermediate screw holes 556 may be provided on case 500 at positions of corner screw holes 555 and intermediate screw holes 556, and lid 400 and case 500 may be fixed to each other by using these fixing parts. For example, in a case where lid 400 and case 500 are fixed to each other by engagement between a claw and a claw hole in which the claw is inserted, one of the claw and the claw hole serve as the fixing part provided on case 500, and the other of the claw and the claw hole is provided on lid 400.

In the above exemplary embodiment, five electricity storage devices 100 are used for electricity storage module 1. Meanwhile, the number of electricity storage devices 100 is not limited to five, and any other number of electricity storage devices 100 may be used for electricity storage module 1.

Further, in the above exemplary embodiment, electric double-layer capacitors are used as electricity storage devices 100. Meanwhile, for example, lithium ion secondary batteries may be used as electricity storage devices 100 instead of capacitors, where an active material for positive electrodes of the lithium ion secondary batteries is lithium transition metal oxide such as lithium cobaltate, and an active material for negative electrodes is carbon material, for example. Further, electricity storage devices 100 do not have to be the above-described non-aqueous electrolyte secondary batteries, and may be secondary batteries other than non-aqueous electrolyte secondary batteries, or may be primary batteries.

Other than the above, various modifications can be appropriately made to the exemplary embodiment of the present disclosure within the scope of the technical idea disclosed in the claims.

Note that, in the description of the above exemplary embodiment, the terms indicating directions such as "upward" and "downward" indicate only relative directions depending on relative positional relation of the structural members, but do not indicate absolute directions such as a vertical direction and a horizontal direction.

The present disclosure is useful for electricity storage modules used for various types of electronic equipment, electrical equipment, industrial equipment, vehicular electric equipment, and the like.

What is claimed is:

1. An electricity storage module comprising:
an electricity storage device;
a case that houses the electricity storage device, the case including a bottom surface part and an opening part located at a side opposite to the bottom surface part;
a lid that covers the opening part; and
a sealing member that seals between the case and the lid, wherein:
the case has
a first case surface that surrounds the opening part along an outer periphery of the opening part,
a second case surface at an outer side of the first case surface, the second case surface being located at a position that is farther away from the bottom surface part than the first case surface is,
a third case surface that connects the first case surface and the second case surface, the third case surface intersecting the first case surface and the second case surface, and
a fourth case surface that is connected to an outer periphery of the second case surface, the fourth case surface intersecting the second case surface, the lid has
a first lid surface facing the first case surface,
a second lid surface that is connected to first lid surface, the second lid surface facing the third case surface, and
a third lid surface at an outer periphery of the first lid surface, the third lid surface intersecting the first lid surface,
the sealing member is disposed between the first case surface and the first lid surface and is disposed between the third case surface and the second lid surface, and
the fourth case surface is located at an outer side of the third lid surface and faces the third lid surface.

2. The electricity storage module according to claim 1, wherein
the first lid surface and the second case surface are in contact with each other.

3. The electricity storage module according to claim 1, wherein
the sealing member is in contact with the third case surface.

4. The electricity storage module according to claim 1, wherein
the sealing member is apart from the second lid surface.

5. The electricity storage module according to claim 1, wherein
a first space is provided between the fourth case surface and the third lid surface.

6. The electricity storage module according to claim 5, wherein:
the case further has a fifth case surface that is connected to an inner periphery of the first case surface, the fifth case surface intersecting the first case surface,
the fifth case surface faces the second lid surface,
a second space is provided between the fifth case surface and the second lid surface, and
a distance between the fourth case surface and the third lid surface in the first space is smaller than a distance between the fifth case surface and the second lid surface in the second space.

7. The electricity storage module according to claim 1, wherein the sealing member is an elastic body and is compressed between the first case surface and the first lid surface.

8. The electricity storage module according to claim 1, wherein:
the lid has a fourth lid surface located at a side opposite to the first lid surface, and
the lid includes a projection part that projects from the fourth lid surface, the projection part being located along the sealing member.

9. The electricity storage module according to claim 8, wherein the projection part is disposed to overlap the sealing member as viewed in a direction from the opening part to the bottom surface part.

10. The electricity storage module according to claim 7, wherein an adhesion strength between the first case surface and the sealing member is greater than an adhesion strength between the first lid surface and the sealing member.

11. The electricity storage module according to claim 7, wherein the sealing member includes ultraviolet curable resin.

12. The electricity storage module according to claim 7, wherein:
the case includes a part surrounding the opening part, the part having an outer periphery of a rectangular shape,
the case includes a first fixing part at each of four corner parts of the rectangular shape, and
two second fixing parts disposed along a longer side of the rectangular shape between two corner parts of the four corner parts, which are arranged along the longer side,
a distance between one of the two second fixing parts and one of the first fixing parts that is closest to the one of the two second fixing parts is smaller than a distance between the two second fixing parts, and
the lid is fixed to the case at each of the first fixing parts and the two second fixing parts.

13. An electricity storage module comprising:
an electricity storage device;
a case that houses the electricity storage device, the case including a bottom surface part and an opening part located at a side opposite to the bottom surface part;
a lid that covers the opening part; and
a sealing member that seals between the case and the lid, wherein:
the case has
a first case surface that surrounds the opening part along an outer periphery of the opening part,
a second case surface at an outer side of the first case surface, the second case surface being located at a position that is farther away from the bottom surface part than the first case surface is,
a third case surface that connects the first case surface and the second case surface, the third case surface intersecting the first case surface and the second case surface,
a fourth case surface that is connected to an outer periphery of the second case surface, the fourth case surface intersecting the second case surface, and
a fifth case surface that is connected to an inner periphery of the first case surface, the fifth case surface intersecting the first case surface, the lid has
a first lid surface facing the first case surface, and
a second lid surface that is connected to first lid surface, the second lid surface facing the third case surface,
the sealing member is disposed between the first case surface and the first lid surface and is disposed between the third case surface and the second lid surface, and
the fifth case surface faces the second lid surface.

14. The electricity storage module according to claim 13, wherein:
the lid further has a third lid surface at an outer periphery of the first lid surface, the third lid surface intersecting the first lid surface,
the fourth case surface faces the third lid surface,
a first space is provided between the fourth case surface and the third lid surface,
a second space is provided between the fifth case surface and the second lid surface, and
a distance between the fourth case surface and the third lid surface in the first space is smaller than a distance between the fifth case surface and the second lid surface in the second space.

15. The electricity storage module according to claim 13, wherein the sealing member is an elastic body and is compressed between the first case surface and the first lid surface.

16. The electricity storage module according to claim 14, wherein:
the lid has a fourth lid surface located at a side opposite to the first lid surface, and
the lid includes a projection part that projects from the fourth lid surface, the projection part being located along the sealing member.

17. The electricity storage module according to claim 16, wherein the projection part is disposed to overlap the sealing member as viewed in a direction from the opening part to the bottom surface part.

18. The electricity storage module according to claim 15, wherein an adhesion strength between the first case surface and the sealing member is greater than an adhesion strength between the first lid surface and the sealing member.

19. The electricity storage module according to claim 15, wherein the sealing member includes ultraviolet curable resin.

20. The electricity storage module according to claim 15, wherein:
- the case includes a part surrounding the opening part, the part having an outer periphery of a rectangular shape,
- the case includes a first fixing part at each of four corner parts of the rectangular shape, and
- two second fixing parts disposed along a longer side of the rectangular shape between two corner parts of the four corner parts, which are arranged along the longer side,
- a distance between one of the two second fixing parts and one of the first fixing parts that is closest to the one of the two second fixing parts is smaller than a distance between the two second fixing parts, and
- the lid is fixed to the case at each of the first fixing parts and the two second fixing parts.

* * * * *